Feb. 14, 1961    D. H. CRONQUIST    2,971,396
POSITIONING DEVICE
Filed June 25, 1958

INVENTOR.
DONALD H. CRONQUIST
BY
Edward A. Robinson
ATTORNEY

United States Patent Office 2,971,396
Patented Feb. 14, 1961

2,971,396

POSITIONING DEVICE

Donald H. Cronquist, Santa Clara, Calif., assignor to International Business Machines Corporation, New York, N.Y., a corporation of New York Filed June 25, 1958, Ser. No. 744,582

5 Claims. (Cl. 74—502)

This invention relates to translating and positioning mechanisms, and more particularly to coaxial tube and wire arrangements for transmitting a relative axial movement or translation from a drive station at one end of the tube and wire to cause a similar translation at the remote end.

Conventional tube and wire devices, sometimes known as Bowden wires, have been used heretofore for transmitting movements or displacements from a control station to actuate a device at a remote point. In such an arrangement, the outer tube is commonly fixed to structural elements at each end thereof, and a wire extending through the tube may be translated or rotated for control of the remote device. It has been found that there is considerable friction affecting the relative movement between the internal wire and the outer tube. The friction may be reduced by packing the tube with a lubricating substance such as grease or oil, but the frictional effects are not eliminated in even a well lubricated Bowden wire device.

One frictional effect between the inner wire and the outer tube produces an undesirable energy loss, and the driving force at the control station must be substantially greater than the force required for moving the actuation device at the remote point. However, an even more objectionable effect lies in the tendency of the inner wire to bind against or stick to the outer tube whereupon the actuation device may be moved in a jerky or erratic manner. The jumpy or jerky motion resulting from a Bowden wire which has a tendency to stick will destroy the accuracy of the translation or displacement which is intended to be passed from the fixed control station.

It is an object of this invention to provide an improved tube and wire remote positioning device wherein the frictional resistance to an axial movement between the inner wire and the outer tube is substantially eliminated.

A further object of this invention is to provide a means for improving the accuracy of a positioning device employing two coaxial members by continuously driving and rotating one of the members relative to the other member while simultaneously transmitting an axial translation between the two members; the relative rotary motion between the members prevents any static frictional effects such that the inner wire will not stick or bind against the outer tube and accurate axial translation is permitted between the members.

Other objects of the invention will be pointed out in the following description and claims and illustrated in the accompanying drawings which disclose, by way of example, the principle of the invention and the best mode which has been contemplated of applying that principle.

Figures 1, 2:
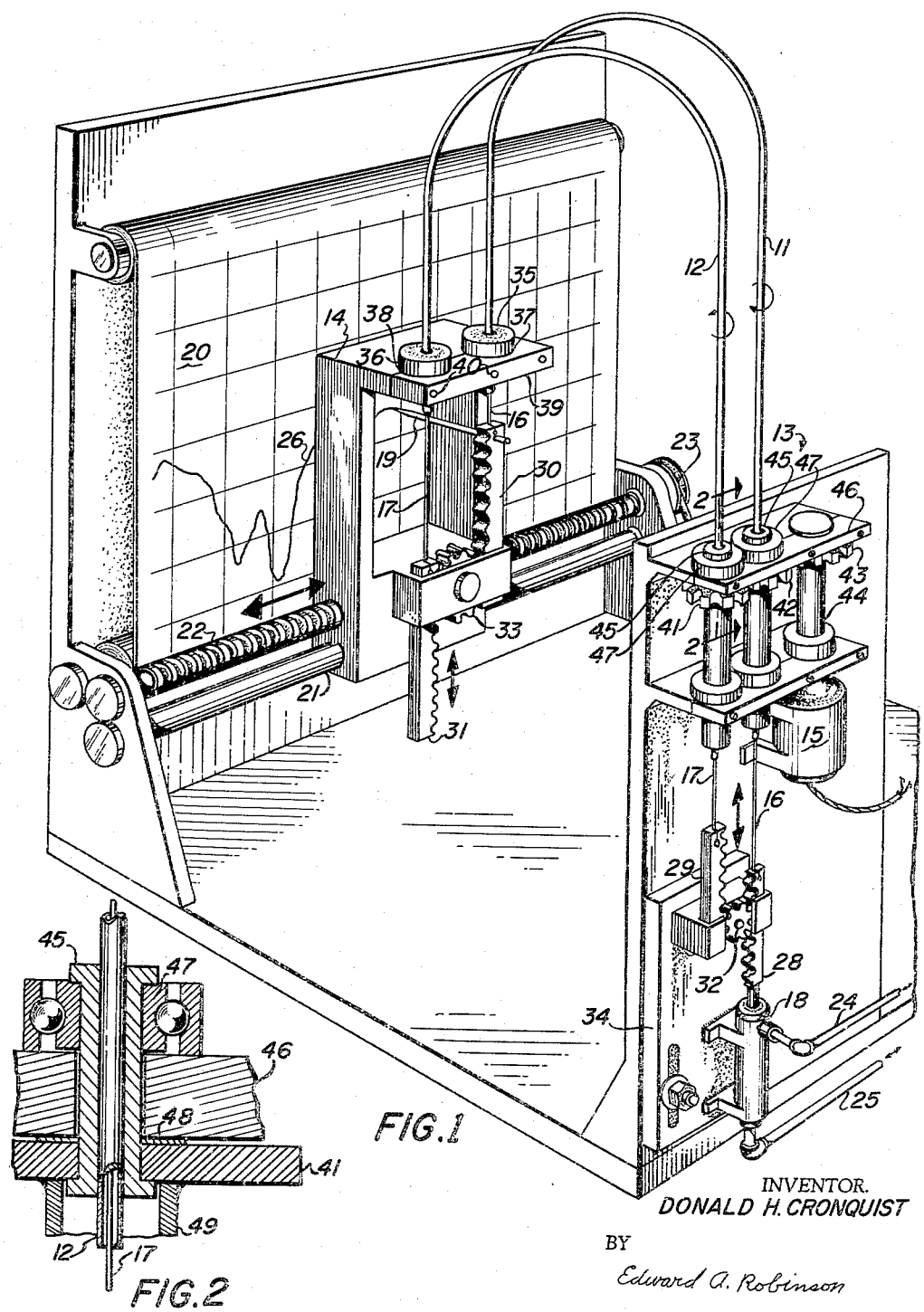
Fig. 1 is a perspective view of a positioning device using the tube and wire arrangement in accordance with the teachings of this invention.
Fig. 2 is an enlarged fragmentary vertical section looking along the plane 2—2 of Fig. 1 and specifically illustrating a rotatable support and drive arrangement associated with the outer tube of the Bowden wire device.

According to a preferred embodiment of this invention, a pair of hollow tubes 11 and 12 extend between a stationary control station 13 and a movable carriage 14. The tubes 11 and 12 are rotatably mounted at each end thereof, and a motor 15 is drivingly coupled to continuously rotate the tubes 11 and 12. Each of the tubes encircles a wire 16 and 17 coaxial therewith and operative to transmit an axial translation from a positional drive mechanism shown as a hydraulic cylinder 18 at the control station 13 to an actuation device such as a stylus pen 19 positioned at the carriage 14. Since each of the outer tubes 11—12 is continuously rotating with respect to the inner wires 16—17, the static friction therebetween has been eliminated and the movement of the remote actuation device 19 may be more precisely controlled by the positional drive device 18.

The specific apparatus shown in Fig. 1 illustrates a means for recording a pressure differential upon a graphical recording sheet 20. The carriage 14 is supported in spaced relation with the recording sheet 20 by a rail 21 and an elongated worm or screw 22. A drive means 23 continuously rotates the screw 22 and causes the carriage to slide along the rail 21 and move at a uniform rate across the recording sheet 20. The pressure differential appears in a pair of conduits 24 and 25 and is converted into movement or displacement of the wire 16 and thereby transmitted to the stylus pen 19 which traces a curve 26.

If only a single Bowden wire 16 were used to mechanically couple the positional drive means 18 to the actuation device 19, a certain amount of "play" or "backlash" would be inevitable since the movement in one direction would necessitate a compression along the wire 16 and at all joints associated therewith, and a movement in the opposite direction would result in a tension or stretching of the wire 16. Therefore, with each change in the direction of axial movement by the position drive means 18, there would be a slight lag resulting in an inaccuracy in the movement of the actuation device 19. The second Bowden wire 17 is mechanically coupled to the first wire at both ends thereof by a means such as the racks 28, 29, 30 and 31 and the pinions 32 and 33. After the double Bowden wire arrangement has been assembled, the complete system including both of the wires 16 and 17, the four end racks 28 through 31 and the pinions 32 and 33 may be tightened by means such as an adjustable joint, or slide such as a mounting plate 34 by which the pinion 32 and the cylinder 18 may be moved downwardly with respect to the tubes 11 and 12. After this system has been tightened, both of the wires 16—17 and all of the joints associated therewith will remain in a state of tension and any movement which the positional drive means 18 produces upon the first rack 28 will be immediately transmitted to the rack 30 and to the actuation device 19 fixed thereto with no substantial backlash being introduced. Since the wires 16 and 17 are in tension, there will be no tendency to buckle as would be the case if a single wire were merely pushed.

The tubes 11 and 12 may be rotatably mounted to the carriage 14 by securing bushings 35 and 36 thereto and providing journals 38 in an extending flange 39 of the carriage. To facilitate assembly thereof, the flange 39 may be fabricated separately from the main portion of the journal 38 and may be secured thereto by means such as studs 40.

The tubes 11 and 12 may be rotatably secured at the fixed station 13 by a similar bearing and journal arrangement, but included therewith are drive gears 41 and 42 which engage each other and further engage a drive gear 43 secured to a shaft 44 and to the armature of the motor 15. The tubes 11 and 12 extend through and are secured to bushings 45 (see Fig. 2). Each bushing 45 extends downwardly through a supporting bracket 46 and is supported by a split ball bearing 47. Each gear 41 and 42 is secured to each bushing 45 and may be separated from the bracket 46 by means such as a washer 48. A sleeve spacer 49 may encircle each tube 11 and 12 and axially support the gears 41 and 42. It will therefore be appreciated that the motor 15 is mechanically coupled to drive and continuously rotate both of the outer tubes 11 and 12 associated with the Bowden wire device.

Because the outer tubes 11 and 12 are continuously rotating with respect to the inner wire 16, there will be no static friction therebetween and no tendency for the wire to stick or adhere to the tubes. Because the static friction and sticking problem has been eliminated and because the backlash has likewise been eliminated by the use of a double set of Bowden wires, it will be seen that the actuation device 19 positioned on a movable carriage remote from the drive positioning means 18 will precisely respond to all axial translation or movement produced by the means 18.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A positioning mechanism comprising: an elongated tube member; an elongated wire member positioned within the tube member and adapted for longitudinal movement thereof; and means for substantially eliminating frictional resistance to relative axial movement between the tube and the wire, said means including a continuously rotating drive means mechanically coupled to one of the members whereby one of the members is continuously rotated with respect to the other member.

2. A positioning mechanism comprising: an elongated flexible tube member; an elongated flexible wire member positioned within the tube member and coaxial therewith; a positioning drive means mechanically associated with the members for translating one of the members axially relative to the other member; means for substantially eliminating frictional resistance to relative axial movement between the members, said means including a continuously rotating drive means mechanically coupled to one of the members for rotating that member with respect to the other; and a translation receiving device mechanically coupled to the members and responsive to the relative axial translation of the two members.

3. A positioning mechanism comprising: a flexible tube with a wire therein; a positioning drive means mechanically coupled to one end of the wire and operative to translate the wire axially with respect to the tube; means for substantially eliminating frictional resistance to relative axial movement between the tube and the wire, said means including a continuously rotating drive means mechanically coupled to the tube to rotate the tube relative to the wire; and an actuation device coupled to the other end of the wire and responsive to the relative axial translation thereof.

4. A positioning mechanism comprising: a pair of flexible tubes each having a wire therein; means rotatably supporting the tubes at each end thereof; means for substantially eliminating frictional resistance to relative axial movement between the tube and the wires, said means including a continuously rotating drive means mechanically coupled to rotate both of the tubes; differential coupling means mechanically associated with both of the wires at each end thereof for causing complementary translation thereof; a positioning drive means mechanically coupled to one end of the wires and operative to translate the wires axially with respect to the tube; and an actuation device coupled to the other end of the wires and responsive to the axial translation thereof.

5. A mechanism for translating and positioning an actuation device which is carried by a movable carriage, said mechanism comprising: an elongated flexible tube having an elongated flexible wire positioned therein, said tube having a first end rotatably mounted at a fixed station and having the second end rotatably mounted on the carriage; means for substantially eliminating frictional resistance to relative axial movement between the tube and the wire, said means including a continuously rotating drive means mechanically coupled to the tube for causing said tube to continuously rotate with respect to the wire; and a positioning drive means mechanically coupled to the wire at the fixed station whereby the wire may be selectively translated axially with respect to the tube, said actuation device on the carriage being mechanically coupled to the wire whereby the selective translation of the drive means at the fixed station is transmitted to the actuation device on the carirage.

References Cited in the file of this patent

UNITED STATES PATENTS

| | | |
|---|---|---|
| 1,270,163 | Jesurun et al. | June 18, 1918 |
| 1,407,015 | De Giers | Feb. 21, 1922 |
| 1,582,378 | Brueckmann | Apr. 27, 1926 |
| 1,600,071 | Shaifer | Sept. 14, 1926 |
| 1,921,983 | Wittkuhns | Aug. 8, 1933 |
| 1,930,272 | Huck | Oct. 10, 1933 |
| 1,983,962 | Barber et al. | Dec. 11, 1934 |
| 1,987,733 | De Fonbrune | Jan. 15, 1935 |
| 2,004,918 | Mitchell | June 11, 1935 |
| 2,189,548 | Gent | Feb. 6, 1940 |
| 2,518,159 | Martin | Aug. 8, 1950 |
| 2,560,938 | Ernst | July 17, 1951 |
| 2,577,942 | Agins | Dec. 11, 1951 |
| 2,869,058 | Poland | Jan. 13, 1959 |